(12) United States Patent
Zhou et al.

(10) Patent No.: US 11,703,039 B2
(45) Date of Patent: Jul. 18, 2023

(54) WOBBLE PLATE PUMP DRIVE WITH GEAR BOX

(71) Applicant: Ridge Tool Company, Elyria, OH (US)

(72) Inventors: Qi Zhou, Shanghai (CN); Kuo Wu, Shanghai (CN)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 17/187,958

(22) Filed: Mar. 1, 2021

(65) Prior Publication Data

US 2022/0042499 A1     Feb. 10, 2022

(30) Foreign Application Priority Data

Aug. 7, 2020 (CN) .......................... 202010788430.X
Aug. 7, 2020 (CN) .......................... 202021628454.0

(51) Int. Cl.
*F04B 9/04*           (2006.01)

(52) U.S. Cl.
CPC .................................... *F04B 9/042* (2013.01)

(58) Field of Classification Search
CPC .......... F01B 9/06; F01B 2009/061–068; F04B 9/02–047; F04B 17/03; F04B 19/22; F04B 35/01; F16H 25/12; F16H 25/122; F16H 25/125
USPC ............................................. 74/22 A, 56, 57
See application file for complete search history.

(56) References Cited

U.S. PATENT DOCUMENTS

| | | | | |
|---|---|---|---|---|
| 324,455 A | * | 8/1885 | Campbell | F16H 25/12 74/57 |
| 3,058,369 A | * | 10/1962 | Vogel | F16H 25/125 74/567 |
| 3,449,967 A | * | 6/1969 | Dancsik | B23D 79/00 173/205 |
| 4,854,837 A | * | 8/1989 | Cordray | F04B 7/06 417/500 |
| 4,942,757 A | | 7/1990 | Pecora | |
| 4,947,672 A | | 8/1990 | Pecora et al. | |
| 5,472,322 A | * | 12/1995 | Huet | F04B 1/12 417/415 |
| 5,477,680 A | | 12/1995 | Heskey et al. | |
| 5,727,417 A | * | 3/1998 | Moffatt | B21F 15/06 72/453.03 |
| 6,343,575 B1 | * | 2/2002 | Deckard | F02B 75/26 123/50 A |
| 7,048,658 B2 | | 5/2006 | Butsch et al. | |
| 7,086,979 B2 | | 8/2006 | Frenken | |
| 7,841,223 B2 | | 11/2010 | Rollins et al. | |

(Continued)

FOREIGN PATENT DOCUMENTS

| | | |
|---|---|---|
| CN | 202997812 | 6/2013 |
| DE | 69401864 | 6/1997 |
| EP | 1390644 B1 | 8/2005 |

OTHER PUBLICATIONS

Examination Report dated Nov. 3, 2021; Application No. EP102021207696.3; 10 pages.

*Primary Examiner* — Thomas Fink

(74) *Attorney, Agent, or Firm* — Mark E. Bandy; Rankin Hill & Clark, LLP

(57) ABSTRACT

Various surface cam planetary mechanisms are described that convert rotational motion to linear reciprocating motion. Also described are assemblies using such mechanisms such as pump drives. A surface cam component used in the mechanisms includes a cam race that exhibits an undulating surface.

15 Claims, 6 Drawing Sheets

(56) References Cited

U.S. PATENT DOCUMENTS

| | | | |
|---|---|---|---|
| 8,276,430 B2 | 10/2012 | Barezzani et al. | |
| 9,217,492 B2 * | 12/2015 | Kierspe | F16H 3/46 |
| 9,328,831 B2 | 5/2016 | Racault et al. | |
| 9,561,595 B1 * | 2/2017 | Dellon | F16H 25/186 |
| 2004/0182189 A1 * | 9/2004 | Frenken | F16H 25/12 |
| | | | 74/412 R |
| 2006/0053830 A1 * | 3/2006 | Adams | F04B 27/1036 |
| | | | 62/498 |
| 2007/0295300 A1 * | 12/2007 | Zhao | F01B 9/04 |
| | | | 123/197.1 |
| 2010/0000288 A1 * | 1/2010 | Barezzani | B25B 27/146 |
| | | | 74/25 |
| 2014/0182874 A1 * | 7/2014 | Barezzani | B25B 27/10 |
| | | | 173/217 |
| 2015/0292493 A1 * | 10/2015 | Suzuki | F04B 35/04 |
| | | | 74/56 |
| 2021/0017968 A1 * | 1/2021 | Myrhum, Jr. | F04B 9/042 |
| 2021/0199010 A1 * | 7/2021 | Georgitzikis | C11B 1/04 |
| 2021/0317900 A1 * | 10/2021 | Aoyagi | F16H 25/12 |

* cited by examiner ously to an axis of rotation of the source of rotary motion. Such orientation can result in inefficiencies, and excessive friction and wear between components. Thus, a need exists for an improved assembly for converting rotary motion into linear reciprocating motion.

WOBBLE PLATE PUMP DRIVE WITH GEAR BOX

CROSS REFERENCES TO RELATED APPLICATIONS

This application claims priority from Chinese invention application serial No. 202010788430.X filed on Aug. 7, 2020. This application also claims priority from Chinese utility model application serial No. 202021628454.0 filed on Aug. 7, 2020.

FIELD

The present subject matter relates to assemblies for converting rotary motion into linear reciprocating motion, and particularly to pumps using such assemblies. The present subject matter also relates to pump drives using such assemblies.

BACKGROUND

In order to convert rotary motion such as produced from a motor, into linear reciprocating motion, a mechanical assembly is typically used. While various such assemblies are known (see, e.g., U.S. Pat. Nos. 7,048,658 and 7,086,979), a need remains for an improved assembly for converting rotary motion into linear reciprocating motion.

Many known assemblies for converting rotary motion to linear reciprocating motion are oriented transversely to an axis of rotation of the source of rotary motion. Such orientation can result in inefficiencies, and excessive friction and wear between components. Thus, a need exists for an improved assembly for converting rotary motion into linear reciprocating motion.

SUMMARY

The difficulties and drawbacks associated with previous approaches are addressed in the present subject matter as follows.

In one aspect, the present subject matter provides in combination with a planetary gear-reduction mechanism rotatably driven about a longitudinal axis by a motor or other drive mechanism, a cam having a peripheral edge portion that is rotated about the longitudinal axis by the gear-reduction mechanism. The cam is configured on a first side adjacent the peripheral edge portion to be operatively engaged by the planetary gear-reduction mechanism. The cam has a second side located opposite the first side. The second side includes a grooved depression defining an undulating surface along the circumference of the peripheral edge portion. The present subject matter also provides, in the noted combination, a support plate configured to operatively engage the undulating surface. Rotation of the support plate about the longitudinal axis relative to the cam results in reciprocating motion of the support plate along the longitudinal axis.

In another aspect, the present subject matter provides a surface cam planetary mechanism comprising a surface cam defining an inner face and an oppositely directed outer face. The surface cam includes a cam race along the outer face of the surface cam. The cam race exhibits an undulating surface. The mechanism also comprises a support plate defining an inner face and an oppositely directed outer face. The support plate includes at least one cam member extending from the inner face of the support plate. The at least one cam member defines a distal cam face. Upon assembly of the surface cam and the support plate, the distal cam face of the at least one cam member contacts the cam race.

In still another aspect, the present subject matter provides a pump drive comprising a motor providing a source of rotary power. The pump drive also comprises a surface cam planetary mechanism including (i) a surface cam defining an inner face and an oppositely directed outer face, the surface cam including a cam race along the outer face of the surface cam, the cam race exhibiting an undulating surface, and (ii) a support plate defining an inner face and an oppositely directed outer face, the support plate including at least one cam member extending from the inner face of the support plate, the at least one cam member defining a distal cam face. The pump drive also comprises a pump piston in operable engagement with the support plate. Upon rotation of the surface cam by the motor, the pump piston undergoes linear reciprocating motion.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

In accordance with the present subject matter, surface cam planetary mechanisms are provided that directly convert rotational motion to linear reciprocating motion. These surface cam planetary mechanisms can be oriented at the same concentricity with a source of rotary motion such as a motor. The mechanisms exhibit a relatively compact size. The mechanisms can also produce a constant output reduction ratio. These aspects and others are described in greater detail herein.

In particular aspects, the present subject matter provides, in combination with a planetary gear-reduction mechanism rotatably driven about a longitudinal axis by a motor or other drive mechanism, a cam having a peripheral edge portion that is rotated about the longitudinal axis by the gear-reduction mechanism. The cam is configured on a first side adjacent the peripheral edge portion to be operatively engaged by the planetary gear-reduction mechanism. The cam has a second side located opposite the first side. The second side includes a grooved depression defining an undulating surface along the circumference of the peripheral edge portion. The present subject matter also provides, in the noted combination, a support plate configured to operatively engage the undulating surface. Rotation of the support plate about the longitudinal axis relative to the cam results in reciprocating motion of the support plate along the longitudinal axis. In certain versions of this combination, the support plate is configured with at least two projections that operatively engage the undulating surface of the grooved depression.

Figure 1:
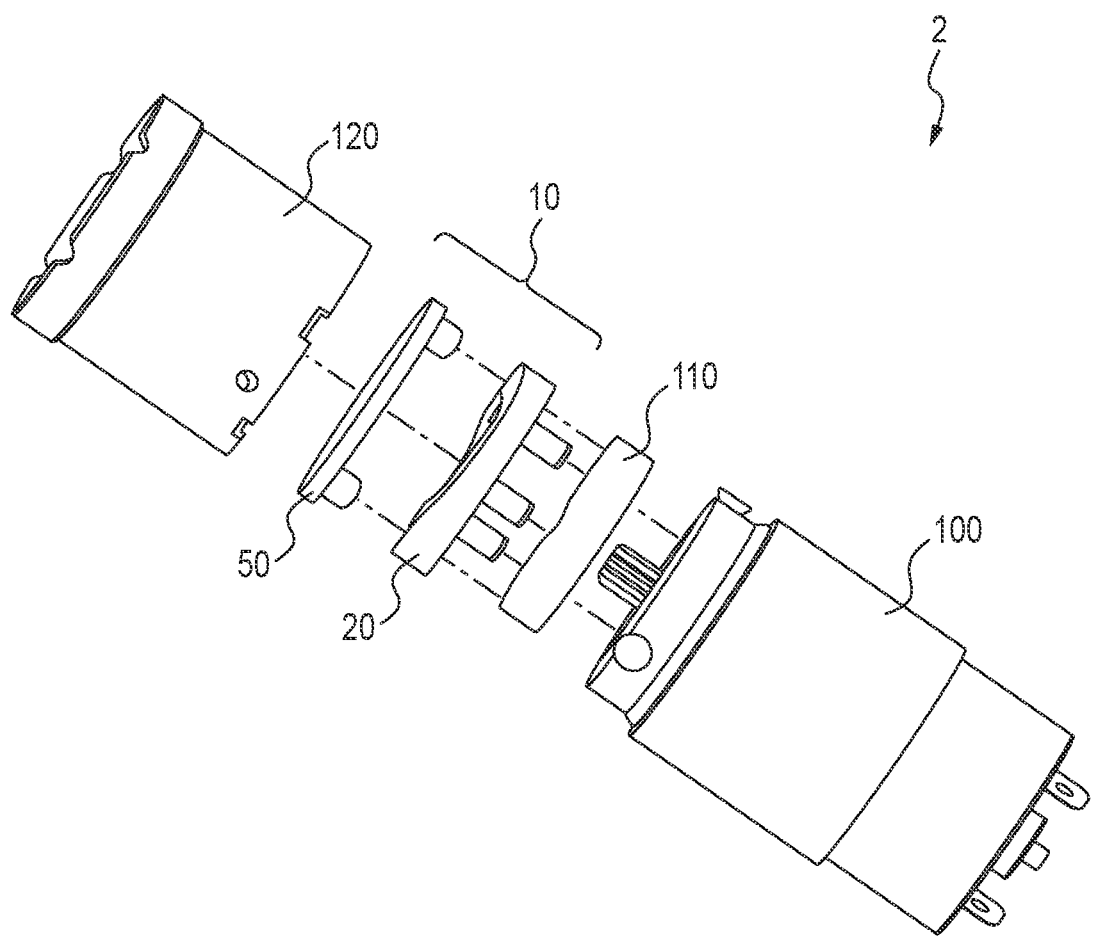
FIG. 1 is a partially exploded assembly view of an embodiment of a pump drive with a surface cam planetary mechanism in accordance with the present subject matter.

FIG. 1 is a partially exploded assembly view of an embodiment of a pump drive 2 with a surface cam planetary mechanism 10 in accordance with the present subject matter. The pump drive 2 comprises a motor or source of rotary motion or power 100, a planetary gear 110 for transferring rotary motion from the motor 2 to the surface cam planetary mechanism 10, and a housing with an optional gear assembly, collectively referenced as 120. The surface cam planetary mechanism 10 converts rotary motion from the motor 100 to linear reciprocating motion available at a support plate 50 and which can be used by another component such as a pump (not shown in FIG. 1). FIG. 1 also illustrates a surface cam 20 used in the surface cam planetary mechanism 10.

Figure 2:
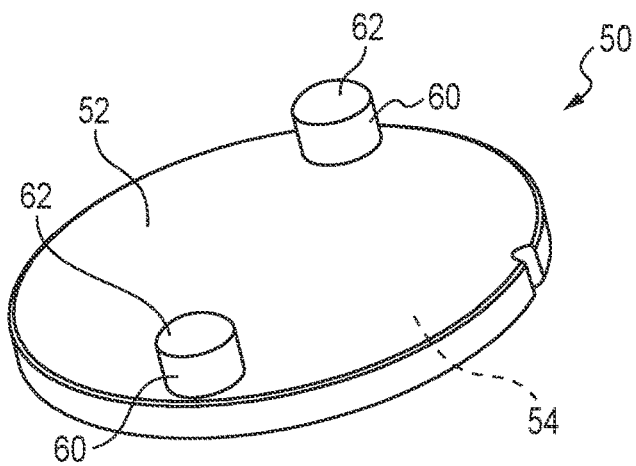
FIG. 2 is an embodiment of a support plate used in a first surface cam planetary mechanism of the present subject matter.
Figure 3:
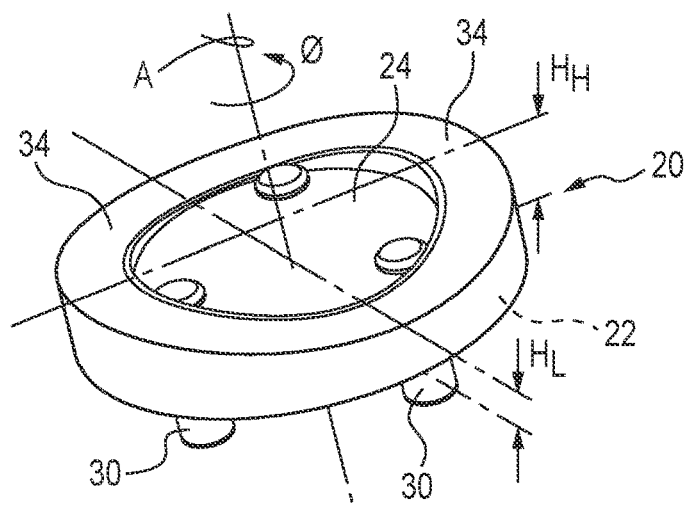
FIG. 3 is an embodiment of a surface cam used in the first surface cam planetary mechanism of the present subject matter.
Figure 4:
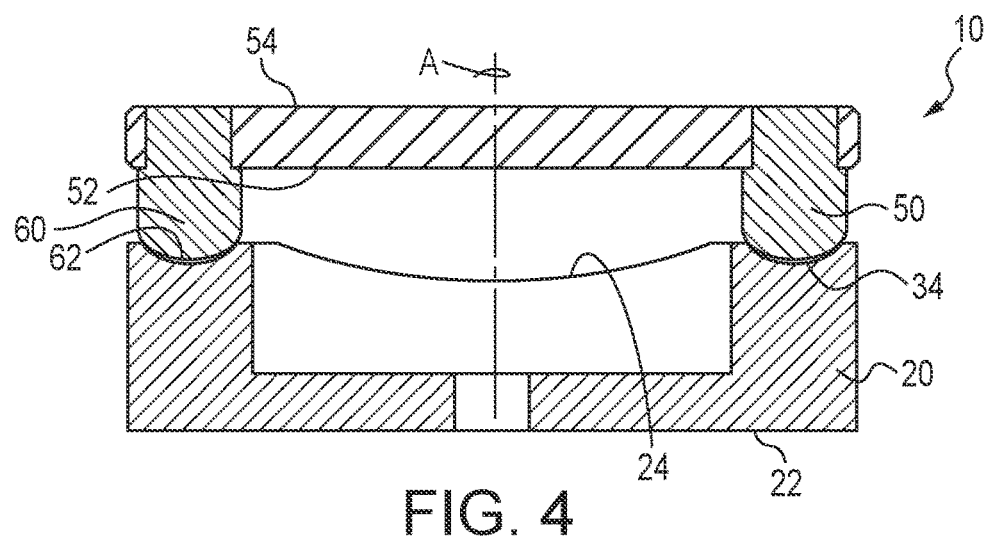
FIG. 4 is a cross sectional view of an embodiment of the first surface cam planetary mechanism of the present subject matter.

FIG. 2 illustrates an embodiment of the support plate 50 used in the surface cam planetary mechanism 10. FIG. 3 illustrates an embodiment of the surface cam 20 used in the surface cam planetary mechanism 10. FIG. 4 illustrates the support plate 50 and the surface cam 20 in an assembled state constituting the surface cam planetary mechanism 10. As will be understood, FIG. 4 is a diametric cross sectional view of the surface cam planetary mechanism 10.

Referring further to the noted figures, the surface cam 20 defines an inner face 22, and an outer face 24 oppositely directed from the inner face 22. The surface cam 20 comprises one or more engagement members 30, and a cam race 34. The engagement members 30 engage, contact, or otherwise couple with a source of rotary motion such as for example the planetary gear 110 shown in FIG. 1. The engagement members 30 extend from the inner face 22 of the surface cam 20. In certain versions, the surface cam 20 includes three engagement members 30. Although three engagement members 30 are described, it will be understood that the present subject matter includes a number of engagement members less than three or greater than three. The cam race 34 is provided along the outer face 24 of the surface cam 20. Although the cam race 34 can be provided in an array of different configurations, orientations, and/or arrangements, in the embodiment depicted in the referenced figures the cam race 34 extends in a generally circular path about a center axis A and along an outer periphery of the surface cam 20 and more particularly along the outer face 24 of the surface cam 20.

Referring further to the referenced figures, the support plate 50 defines an inner face 52, and an outer face 54 oppositely directed from the inner face 52. The support plate 50 comprises one or more cam members 60 extending from the inner face 52 of the support plate 50. Each cam member 60 defines a distal or an outermost cam face 62. In certain versions, the support plate 50 includes two cam members 60. Although two cam members 60 are described, it will be understood that the present subject matter includes a number of cam members less than two or greater than two. Typically, the two cam members 60 are equally spaced along the circumferential periphery of the support plate, or located diametrically across from each other as shown in FIG. 2. If more than two cam members are used such as three, the cam members are equally spaced from each other along the circumferential periphery of the support plate. Upon assembly of the support plate 50 and the surface cam 20, the cam members 60 of the support plate 50 are directed toward the outer face 24 and the cam race 34 of the surface cam 20. Upon assembly, the cam faces 62 of the cam members 60 contact the cam race 34 of the surface cam 20.

An aspect of the cam race 34 is that the cam race exhibits an "undulating surface." That is, the cam race 34 varies in elevation depending upon the angular location along the cam race 34. Specifically, and with reference to FIG. 3, the undulating surface and particularly the elevation of the undulating surface of the cam race 34 can be expressed as a sine wave as angular location or position various along the cam race 34. Thus, as an angular position of a cam member 60 is varied along the undulating surface of the cam race 34, the elevation of the cam member 60 in contact with the cam race 34, changes. More specifically, in certain embodiments, the elevation of the cam member 60 in contact with the cam race 34, varies according to a sine wave. The elevation is measured or referenced along an axis parallel with axis A. Thus, in such embodiments, the undulating surface of the cam race varies in elevation according to a sine wave. It will be understood that the present subject matter includes a wide array of geometries, arrangements, and configurations for the cam race 34. Thus, the cam race is in no way limited to the representative example depicted in FIG. 3 and described herein.

In particular versions in which the undulating surface of the cam race 34 varies in elevation according to a sine wave, the cam race 34 is configured based at least partially upon, the number of cam members 60 of the support plate 50. In such versions, the change in elevation of the undulating surface of the cam race as angular position is varied along the surface, varies according to a sine wave. The length of this repeating portion of the sine wave (as measured along an arcuate path on the cam race) is referred to herein as the "wavelength" ($\lambda$) of the cam race. In such versions, the undulating surface of the cam race 34 exhibits a wavelength ($\lambda$) equal to the number of cam members (P) of the support plate multiplied by an integer ($\eta$) of at least 1:

$$\eta = P\eta \quad \text{(I)}$$

For example, if the support plate 50 includes two (2) cam members 60, then the undulating surface of the cam race exhibits a wavelength of at least 2 (and so $\eta=1$), and could be 4 (in which $\eta=2$), 6 (in which $\eta=3$), . . . , etc. In another example, if the support plate 50 includes three (3) cam members 60, then the undulating surface of the cam race exhibits a wavelength of at least 3 (for $\eta=1$), and could be 6 (in which $\eta=2$), 9 (in which $\eta=3$), . . . , etc. As will be understood, in formula (I), P typically ranges from 1 to about 6 or more; and η typically ranges from 1 to 4 or more. In most embodiments, η ranges from 2 to 4.

In particular versions in which the undulating surface of the cam race 34 varies in elevation according to a sine wave, the elevation (E) of the cam race 34 can be expressed as:

$$E = f(H_L, H_H, \Theta) \quad \text{(II)}$$

In formula (II), E is the elevation of the surface of the cam race 34 as measured or referenced along an axis parallel with axis A (see FIG. 3); $H_L$ is the minimum height of the surface of the cam race 34, $H_H$ is the maximum height of the surface of the cam race 34, and $\Theta$ is the angular location on the surface of the cam race 34 as measured about axis A.

Figure 10:
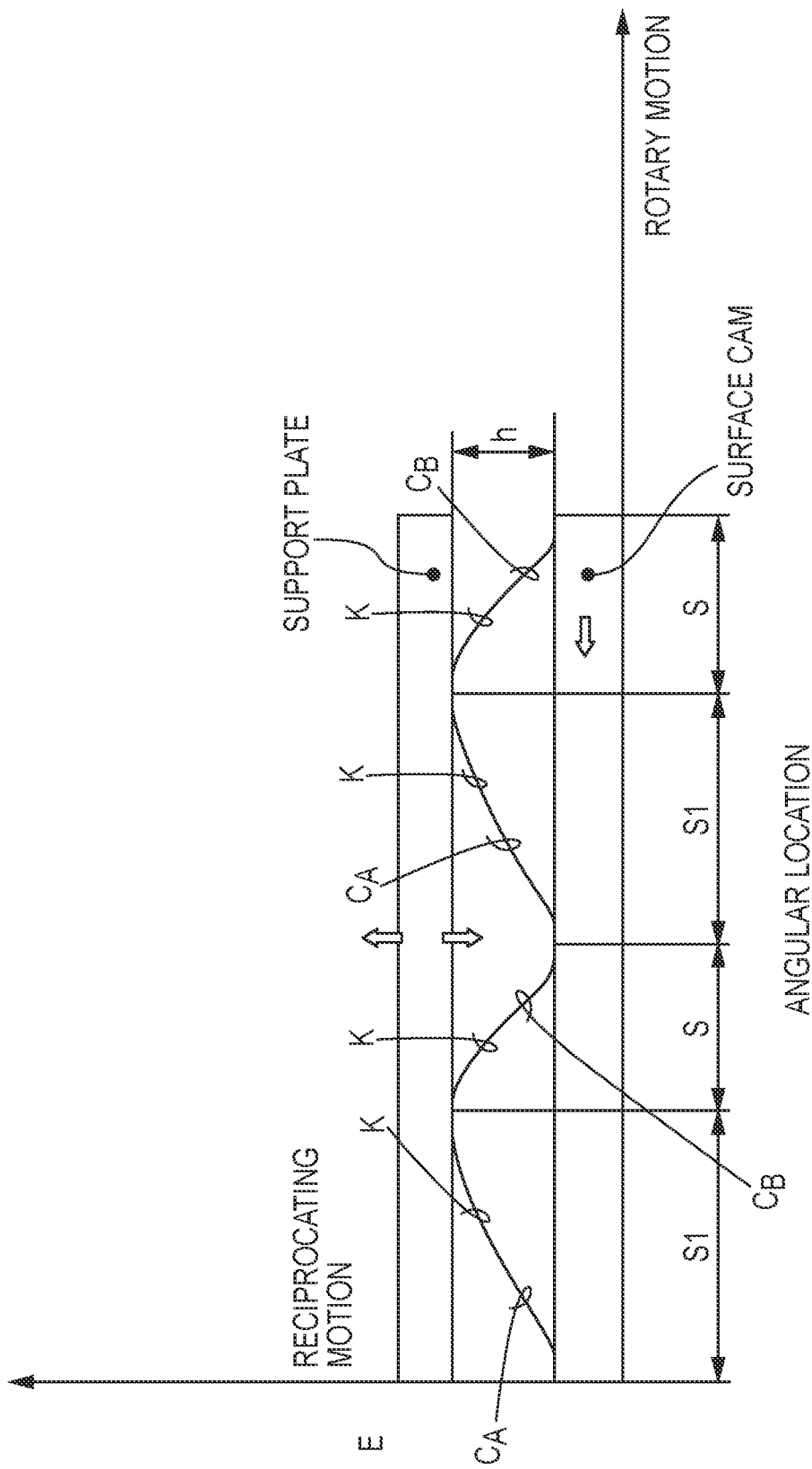
FIG. 10 is a graph illustrating elevation of a cam race as a function of angular location on the cam race in accordance with an embodiment of the present subject matter.

In still additional versions, the undulating surface of the cam race 34 varies in elevation according to function formula sets (III) and (IV) set forth below. Referring to FIG. 10, a graph is presented illustrating elevation (E) of the cam race 34 as a function of angular location on the surface of the cam race as measured about axis A. Oscillating line K comprises two (2) pairs of equivalent curves $C_A$ and $C_B$, in which each curve is expressed by multi-order functions. The curves are connected via smooth transitions. The two pairs of curves are expressed by function formula sets (III) and (IV). Curve $C_A$ is expressed by function formulas (III):

$$x = R^* \sin(t^*(90 + a \sin(\Delta X/R)))$$

$$y = R^* \cos(t^*(90 + a \sin(\Delta X/R)))$$

$$z = e/2^*(\cos(t^*180) - 1) \quad \text{(III)}$$

Curve $C_B$ is expressed by function formulas (IV):

$$x = R^* \sin(t^*(a \sin(\Delta X/R) - 90))$$

$$y = R^* \cos(t^*(a \sin(\Delta X/R) - 90))$$

$$z = e/2^*(\cos(t^*180) - 1) \quad \text{(IV)}$$

In these formula sets, R=14.5, e=2.2, Δx=3.2, and t=0-1. In FIG. 10, regions S and $S_1$ are regions along the cam race 34 in which $S_1 + S + S_1 + S$ equal 360°, i.e., one revolution about axis A.

FIG. 4 illustrates another aspect of the surface cam planetary mechanism 10. This aspect involves a mating interface between the outermost cam face(s) 62 and the cam race 34. The term "mating interface" refers to a fitting engagement characteristic of the outermost cam face 62 and the cam race 34. In the version depicted in FIG. 4, the outermost cam face 62 exhibits a convex geometry and the cam race 34 exhibits a concave geometry when viewed in cross section. In particular versions, the curvature of the convex cam face 62 is the same or substantially the same as the curvature of the concave cam race 34. As will be understood, such matching curvatures promote the fitting engagement characteristic of the cam face 62 and the cam race 34. The present subject matter includes other configurations for the mating interface such as a concave geometry for the outermost cam face 62 and a convex geometry for the cam race 34. It will be understood that the present subject matter encompasses a wide array of other configurations and is not limited to concave/convex.

Figure 5:
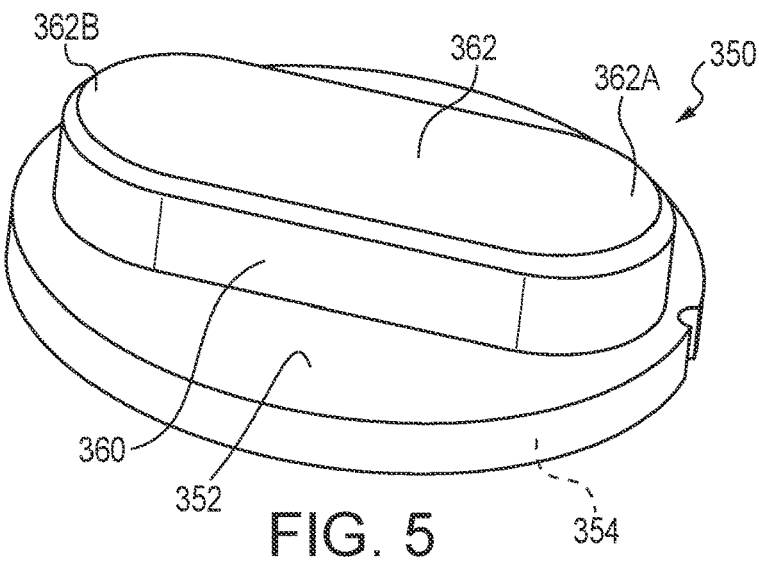
FIG. 5 is another embodiment of a support plate used in a second surface cam planetary mechanism of the present subject matter.
Figure 6:
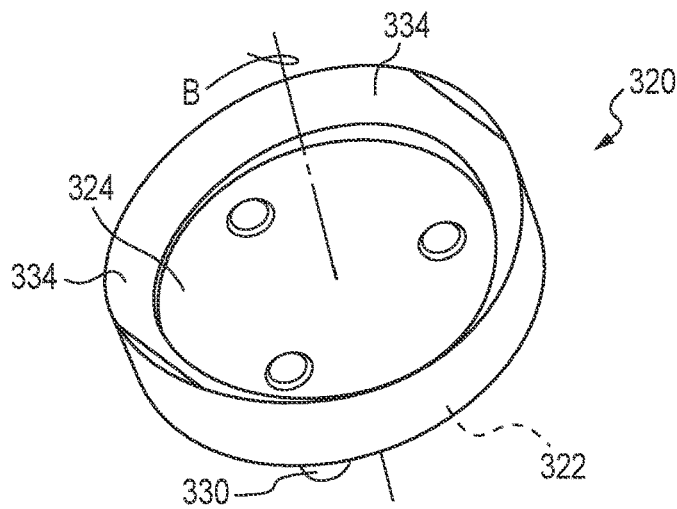
FIG. 6 is another embodiment of a surface cam used in the second surface cam planetary mechanism of the present subject matter.
Figure 7:
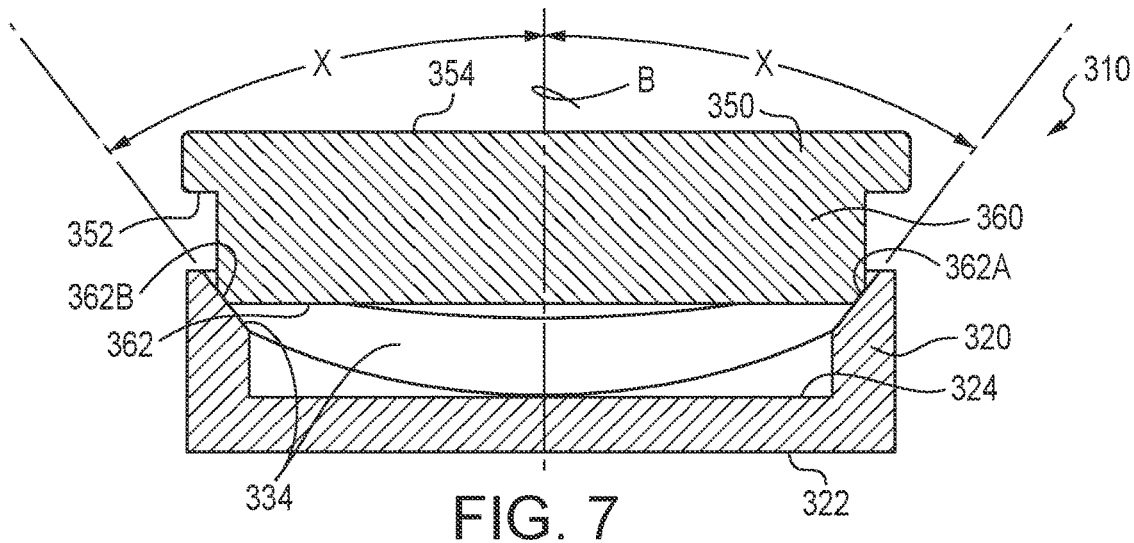
FIG. 7 is a cross sectional view of an embodiment of the second surface cam planetary mechanism of the present subject matter.

FIGS. 5-7 illustrate another embodiment of a surface cam planetary mechanism 310 in accordance with the present subject matter. The surface cam planetary mechanism 310 comprises a surface cam 320 and a support plate 350.

FIG. 5 illustrates an embodiment of the support plate 350 used in the surface cam planetary mechanism 310. FIG. 6 illustrates an embodiment of the surface cam 320 used in the surface cam planetary mechanism 310. FIG. 7 illustrates the support plate 350 and the surface cam 320 in an assembled state constituting the surface cam planetary mechanism 310. As will be understood, FIG. 7 is a diametric cross sectional view of the surface cam planetary mechanism 310.

Referring further to the noted figures, the surface cam 320 defines an inner face 322, and an outer face 324 oppositely directed from the inner face 322. The surface cam 320 comprises one or more engagement members 330, and a cam race 334. The engagement members 330 engage, contact, or otherwise couple with a source of rotary motion such as for example the planetary gear 110 shown in FIG. 1. The engagement members 330 extend from the inner face 322 of the surface cam 320. In certain versions, the surface cam 320 includes three engagement members 330. However, as previously noted, the surface cam 320 can include a greater or lesser number of engagement members 330. The cam race 334 is provided along the outer face 324 of the surface cam 320. Although the cam race 334 can be provided in an array of different configurations, orientations, and/or arrangements, in the embodiment depicted in the referenced figures the cam race 334 generally extends in a circular path about a center axis B and along an outer periphery of the surface cam 320 and more particularly along the outer face 324 of the surface cam 320.

Referring further to the referenced figures, the support plate 350 defines an inner face 352, and an outer face 354 oppositely directed from the inner face 352. The support plate 354 comprises a single cam member 360 extending from the inner face 352 of the support plate 350. The cam member 360 defines a distal or an outermost cam face 362 having cam face regions 362A and 362B. In many versions, the two cam face regions 362A and 362B are oppositely located from each other. Upon assembly of the support plate 350 and the surface cam 320, the cam member 360 of the support plate 350 is directed toward the outer face 324 of the surface cam 320. Upon assembly, the cam face regions 362A and 362B of the cam member 360 contact the cam race 334 of the surface cam 320.

The cam race 334 also exhibits an undulating surface as previously described in association with the cam race 34 of the surface cam planetary mechanism 10.

FIG. 7 illustrates another aspect of the surface cam planetary mechanism 310. This aspect refers to a mating interface between the cam face regions 362A and 362B of the outermost cam face 362 and the cam race 334. As previously described, this term refers to a fitting engagement characteristic of the cam face regions 362A and 362B, and the cam race 334. In the version depicted in FIG. 7, the cam race 334 exhibits an angled slope when viewed in the noted cross section of FIG. 7, in which the angle of slope is denoted as angle X in FIG. 7. As shown in FIG. 7, angle X is taken with respect to the axis B of the surface cam 320, which upon assembly of the surface cam 320 and the support plate 350, is also a center axis of the mechanism 310. Typically, angle X is within a range of about 30° to about 80°, particularly from 40° to 50°, and most particularly 45°. As will be understood, the cam face regions 362A and 362B of the outermost cam face 362 exhibit the same angle as angle X of the cam race 334.

Figure 8:
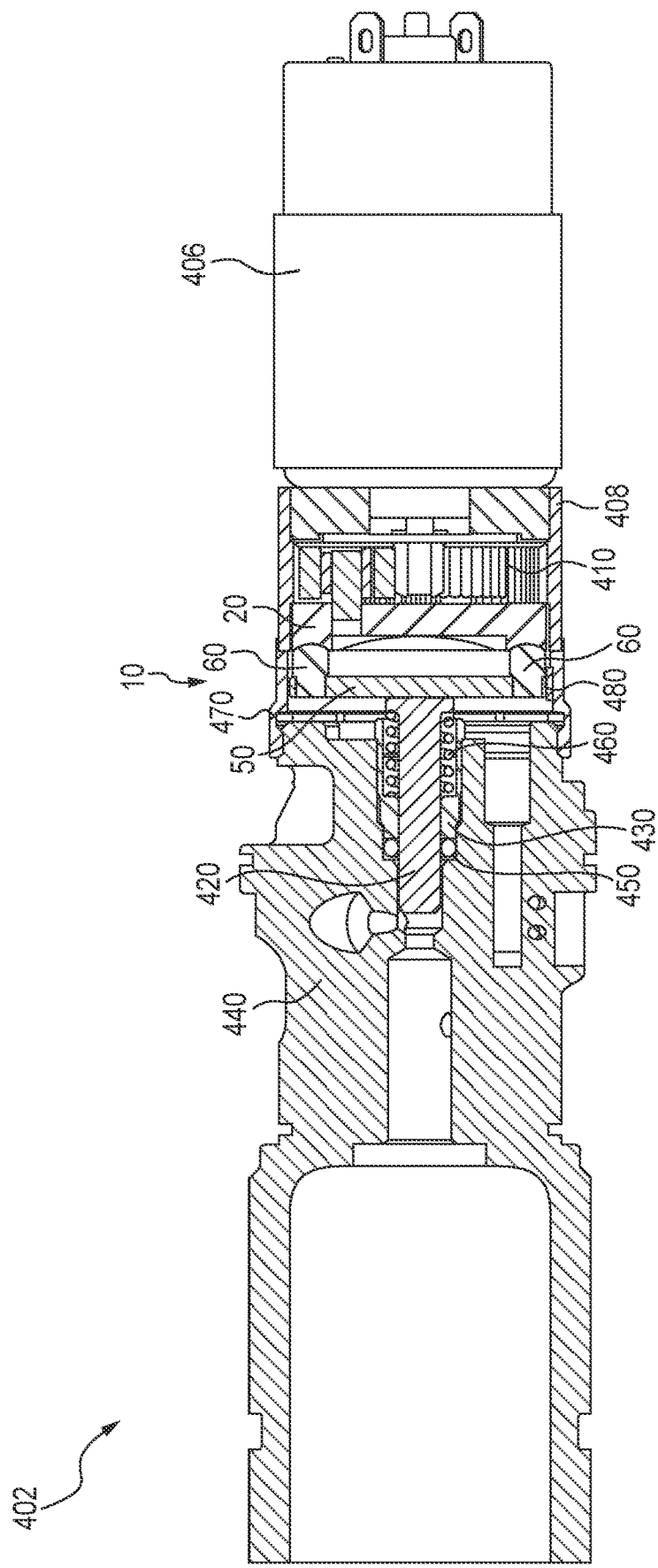
FIG. 8 is a schematic cross sectional view of an embodiment of a pump drive using the first surface cam planetary mechanism in accordance with the present subject matter.

FIG. 8 is a schematic cross sectional view of an embodiment of a pump drive 402 using the previously described surface cam planetary mechanism 10 in accordance with the present subject matter. Specifically, FIG. 8 is a diametric cross sectional view of the pump drive 402 comprising the surface cam planetary mechanism 10. The pump drive 402 also comprises a motor 406, a gear ring 408, and a planetary gear 410. Upon actuation of the motor 406, rotary motion is transferred from the motor 406 to the surface cam 20 of the mechanism 10, via the planetary gear 410. The mechanism 10 converts the rotary motion to linear reciprocating motion available at the support plate 50 as described herein. As noted, the support plate 50 includes cam member(s) 60 contacting the surface cam 20. The linear reciprocating motion is delivered to a pump piston 420. The pump piston 420 is slidingly received and supported within a pump housing 430. The pump housing 430 is generally enclosed within a cylinder 440. One or more seals such as O-ring(s) 450 can be used along the pump piston 420. A spring 460 can be used to bias the pump piston 420. One or more retaining members or washers 470 can be provided along a periphery of the pump cylinder 440. And, one or more pins 480 can be used to promote or guide linear movement of the support plate 50 and its cam member(s) 60.

Figure 9:
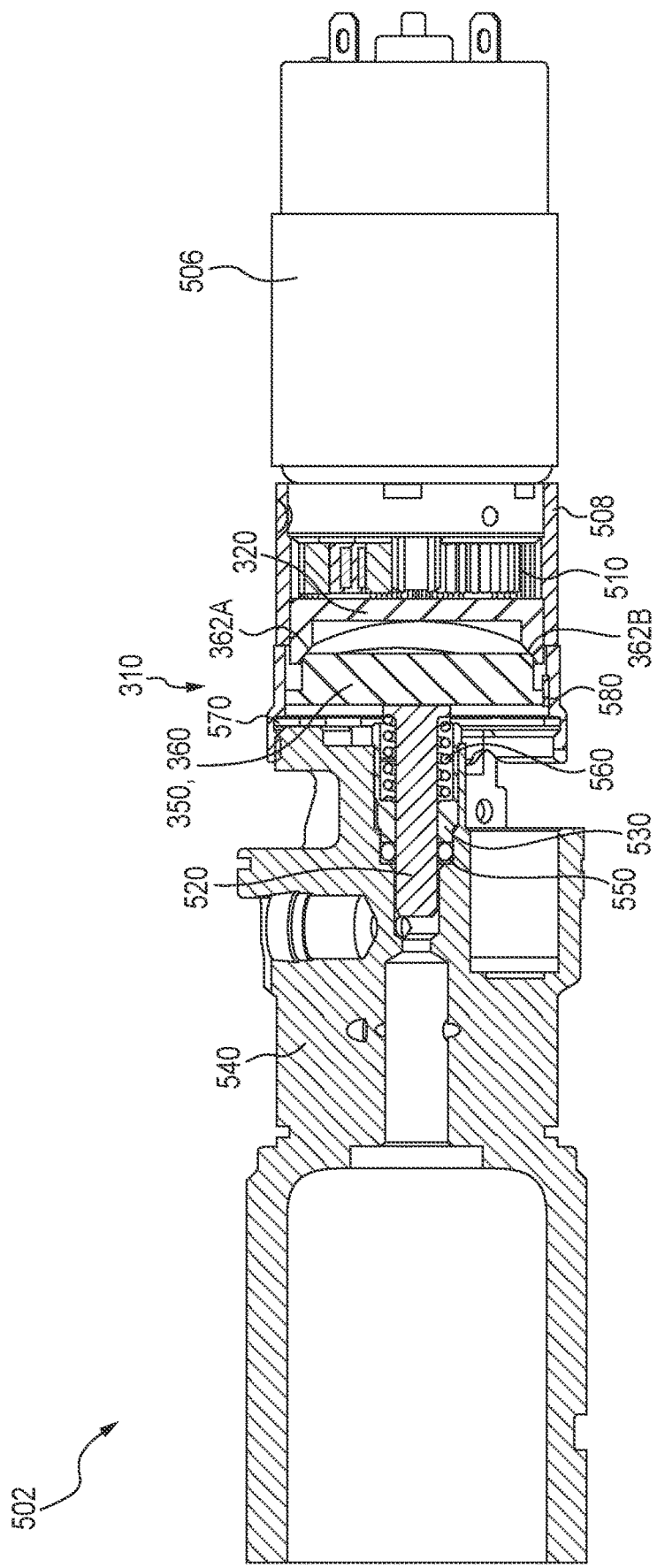
FIG. 9 is a schematic cross sectional view of another embodiment of a pump drive using the second surface cam planetary mechanism in accordance with the present subject matter.

FIG. 9 is a schematic cross sectional view of an embodiment of a pump drive 502 using the previously described surface cam planetary mechanism 310 in accordance with the present subject matter. Specifically, FIG. 9 is a diametric cross sectional cross sectional view of the pump drive 502 comprising the surface cam planetary mechanism 310. The pump drive 502 also comprises a motor 506, a gear ring 508, and a planetary gear 510. Upon actuation of the motor 506, rotary motion is transferred from the motor 506 to the surface cam 320 of the mechanism 310 via the planetary gear 510. The mechanism 310 converts the rotary motion to linear reciprocating motion available at the support plate 350 as described herein. As noted, the support plate 350 includes the cam member 360 with regions 362A and 362B contacting the surface cam 320. The linear reciprocating motion is delivered to a pump piston 520. The pump piston 520 is slidingly received and supported within a pump housing 530. The pump housing is generally enclosed within a cylinder 540. One or more seals such as O-rings 550 can be used along the pump piston 520. A spring 560 can be used to bias the pump piston 520. One or more retaining members or washers 570 can be used along a periphery of the pump cylinder 540. And, one or more pins 580 can be provided to promote or guide linear movement of the support plate 350 and its cam member 360.

The surface cam planetary mechanisms such as mechanisms 10 and 310 of the present subject matter provide numerous advantages and benefits. By use of the planetary gear 110 and/or the housing with gear assembly 120, a constant reduced ratio output can be provided. The surface cam planetary mechanisms efficiently and directly convert rotational motion to linear reciprocating motion. The surface cam planetary mechanisms and particularly when incorporated in a pump drive such as pump drives 2, 402, or 502, achieve a relatively small and compact size, which can be incorporated in an inline fashion in a drive assembly.

The present subject matter and particularly the assemblies for converting rotary motion into linear reciprocating motion, pumps using such assemblies, and related methods, will find wide industrial applicability. For example, the present subject matter can be used in the fields of pumps and/or compressors and a variety of residential and industrial applications in which fluids, liquids, and/or slurries are moved by mechanical action of the pump. The present subject matter can also be used in devices that utilize pumps, compressors, and/or like components.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. In combination with a planetary gear-reduction mechanism rotatably driven about a longitudinal axis by a motor or other drive mechanism,
a cam having a peripheral edge portion that is rotated about the longitudinal axis by the gear-reduction mechanism, wherein the cam includes at least one engagement member extending from a first side of the cam and the at least one engagement member engaging the gear-reduction mechanism wherein the cam has a second side located opposite the first side, wherein the second side defines an undulating surface along the circumference of the peripheral edge portion with a concave profile perpendicular to the longitudinal axis, and
a support plate configured to operatively engage the undulating surface of the cam;
wherein the support plate is configured with at least two cylindrical cam members fixed to and extending longitudinally from an inner face of the support plate each having a convex shaped end portion corresponding to the concave profile of the undulating surface and operatively in sliding engagement with the undulating surface of the cam,
whereby rotation of the cam about the longitudinal axis relative to the support plate results in reciprocating motion of the support plate along the longitudinal axis.

2. The combination of claim 1, wherein the undulating surface varies in elevation according to a sine wave.

3. A surface cam planetary mechanism comprising:
(i) first assembly comprising:
a surface cam having a longitudinal axis and defining an inner face extending perpendicular to the longitudinal axis and an oppositely directed outer face, the surface cam including a cam race extending circumferentially along an outer periphery of the outer face of the surface cam, the cam race exhibiting an undulating surface;
a support plate defining an inner face which faces along the longitudinal axis and an oppositely directed outer face, the support plate including at least one cam member fixed to and extending from the inner face of the support plate, the at least one cam member extending perpendicularly to the longitudinal axis along the inner face of the support plate from a first end to an opposite second end, the at least one cam member defining a distal cam face along the first and second ends;
wherein upon assembly of the surface cam and the support plate, the distal cam face at the first and second ends of the at least one cam member contacts the cam race at opposite locations of the circumference of the cam race;

wherein the surface cam further includes at least one engagement member extending from the inner face of the surface cam, whereby rotation of the surface cam about the longitudinal axis results in sliding contact between the cam race and the cam face to cause reciprocating motion of the support plate along the longitudinal axis;

or, (ii) a second assembly comprising:

a surface cam having a longitudinal axis and defining an inner face extending perpendicular to the longitudinal axis and an oppositely directed outer face, the surface cam including a cam race extending circumferentially along an outer periphery of the outer face of the surface cam, the cam race exhibiting an undulating surface with a concave geometry perpendicular to the longitudinal axis;

a support plate defining an inner face which faces along the longitudinal axis and an oppositely directed outer face, the support plate is configured with at least two cylindrical cam members fixed to and extending longitudinally from an inner face of the support plate each having a convex shaped end portion corresponding to the concave profile of the undulating surface and operatively in sliding engagement with the undulating surface of the cam;

whereby rotation of the surface cam about the longitudinal axis results in reciprocating motion of the support plate along a longitudinal axis.

4. The surface cam planetary mechanism of claim 3 wherein the two cam members are located diametrically across from each other.

5. The surface cam planetary mechanism of claim 3 wherein the support plate of the first assembly includes a single cam member extending from the inner face of the support plate.

6. The surface cam planetary mechanism of claim 3 wherein the undulating surface of the cam race of the first assembly or the second assembly varies in elevation according to a sine wave.

7. The surface cam planetary mechanism of claim 3 wherein the distal cam face of the first assembly exhibits a convex geometry.

8. The surface cam planetary mechanism of claim 3 wherein the cam race of the first assembly exhibits a concave geometry.

9. The surface cam planetary mechanism of claim 3 wherein the cam race of the first assembly exhibits an angled slope.

10. The surface cam planetary mechanism of claim 9 wherein the angled slope is within a range of from 30° to 80° relative to a center axis of the mechanism.

11. A pump drive comprising;
a motor providing a source of rotary power;
a surface cam planetary mechanism according to claim 3;
a pump piston in operable engagement with the support plate;
wherein upon rotation of the surface cam by the motor, the pump piston undergoes linear reciprocating motion.

12. The pump drive of claim 11 wherein the distal cam face of the first assembly exhibits a convex geometry.

13. The pump drive of claim 11 wherein the cam race of the first assembly exhibits a concave geometry.

14. The pump drive of claim 11 wherein the cam race of the first assembly exhibits an angled slope.

15. The pump drive of claim 11 wherein the undulating surface of the cam race of the first assembly or the second assembly varies in elevation according to a sine wave.

* * * * *